Feb. 23, 1926.  
C. H. GRINGS  
HAME HOLDER FOR HORSE COLLARS  
Filed Dec. 11, 1924
1,574,478
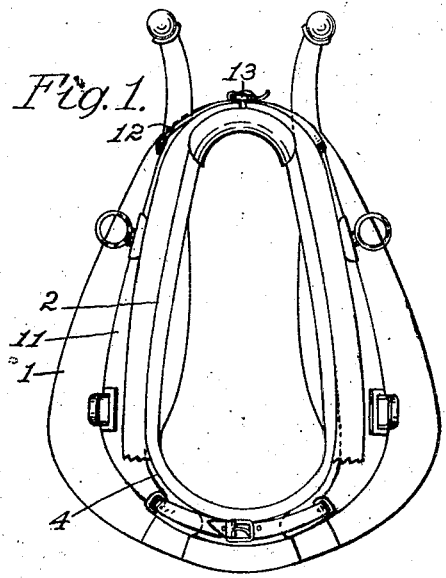
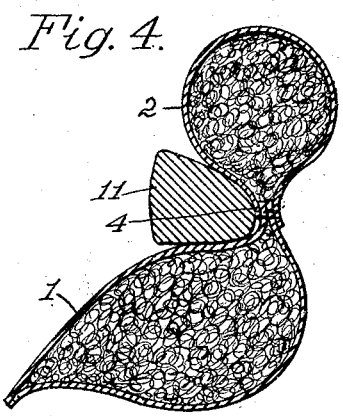
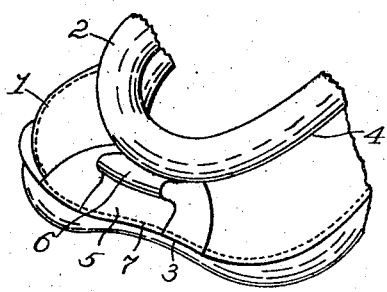
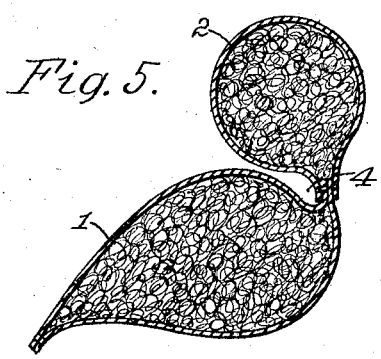
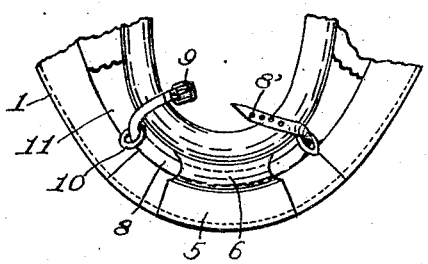
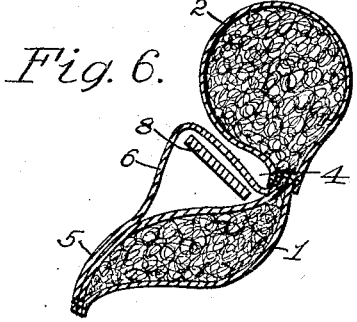
Inventor,
C. H. Grings, by
Geo. C. Kennedy,
Attorney.

Patented Feb. 23, 1926.

1,574,478

UNITED STATES PATENT OFFICE.

CASPER HUGO GRINGS, OF WATERLOO, IOWA, ASSIGNOR TO WATERLOO SADDLERY COMPANY, OF WATERLOO, IOWA.

HAME HOLDER FOR HORSE COLLARS.

Application filed December 11, 1924. Serial No. 755,334.

*To all whom it may concern:*

Be it known that I, CASPER HUGO GRINGS, a citizen of the United States, residing at Waterloo, in the county of Black Hawk and State of Iowa, have invented certain new and useful Improvements in Hame Holders for Horse Collars, of which the following is a specification.

My invention relates to improvements in hame holders for horse collars, and the object of my improvement is to supply inexpensive, durable and convenient means on a horse collar for securing the hames in the hame seats thereof without possibility of accidental displacements therefrom while in use.

This object I have accomplished by the means which are hereinafter described and claimed, and which are illustrated in the accompanying drawings, it being understood that changes in the precise embodiment of invention herein disclosed can be made within the scope of what is claimed without departing from the spirit of the invention.

In said drawings:

Fig. 1 is a front elevation of a horse collar as equipped with my improved hame holding means, parts being broken away; Fig. 2 is an enlarged detail perspective view of the lower portion of the collar only showing the strap securing loop as mounted at the throat thereof. Fig. 3 is an enlarged detail elevation of the lower portion of the collar, showing the lower ends of the hames mounted in the hame seats thereof and secured there by means of a strap passed through the throat loop, but unconnected. Fig. 4 is an enlarged cross section of one side part of the collar, showing a hame in cross section mounted in the hame seat thereof as in ordinary practice. Fig. 5 is a similar sectional view of the collar, without the hame in the hame seat, showing the connected parts of the collar collapsed together to thereby close the hame seat. Fig. 6 is an enlarged cross section of the throat part of the collar, showing the throat loop thereof and the fastening strap for the hames in section also.

As is well known in the art, the ordinary type of horse collar has a pad 1 and roll 2 on each side united at the throat 3 but separably connected at the upper ends, and the circumferential hollow between the pads and rolls is used as a grooved or troughed seat for the two hames 11.

However, while the tops and bottoms of the hames are connected separably by straps or other fastenings 12—13, yet when in the said hame seats at 4 and under the constant stresses of hard usage the hames will often become displaced from the hame seats, causing great inconvenience and delay in replacement.

Referring to Figs. 4 and 5, Fig. 4 shows the manner in which the hame 11 is fitted to and seated in the hollow seat 4 between the pad 1 and the roll 2. The connection between the pad and roll is narrow and flexible, and its flexibility is much increased under constant use so that in time the roll and pad tend to pinch inwardly toward each other so that unless the hames 11 are quite tightly and securely fastened on the collar, they will under the manifold movements and stresses of use work out of the hame seats 4 and thence work off the collar. It is to prevent this that I have provided means for holding and securing the hames upon the collar without possibility of such accidental or usage displacements.

In Fig. 6 as in Figs. 1 to 3 inclusive, I have shown a flexible leather piece 5 sewn at 7 upon the bottom of the pad 1 at its throat 3 and whose upper part is allowed to be slack to supply a transverse and relatively wide loop 6 united at its upper edge to the collar. When the hames are placed in the hame seats 4 with the upper ends connected by strap parts 12 and buckle 13, a separate strap 8 is passed through the throat loop 6, and also through both eyes 10 on the lower extremities of the hames 11 where they may be adjustably fastened together by means of the strap holes 8' and the end buckle 9. It will be seen that the securing means shown insures the holding of the hames in their seats 4, adjustably, so that no weakness or increased flexibility in the connections of the pads and roll will permit displacements of the hames.

Having described my invention, what I claim as new, and desire to secure by Letters Patent, is:

1. In combination, a horse collar having pads and a roll with hollow hame seats therebetween, a wide flexible wear loop end-secured across the collar at its throat by stitching, and a flexible fastening device loosely traversing said loop and terminal eyes on hames seated in said hame seats to releasably secure the hames in said seats.

2. In combination, a horse collar having pads and a roll with a flexible connection therebetween which provides a hollow circumferential seat for hames, a flexible relatively wide transversely opening loop mounted upon the throat of the collar, and a strap passed flexibly through said loop and terminal eyes on the hames seated in the hame seat and having comating fastening means on its ends whereby the hames may be secured in said seat against displacements.

In testimony whereof I affix my signature.

CASPER HUGO GRINGS.